(12) United States Patent
Pra et al.

(10) Patent No.: US 9,222,701 B2
(45) Date of Patent: Dec. 29, 2015

(54) MODULAR SOLAR RECEIVER AND SOLAR POWER PLANT COMPRISING AT LEAST ONE SUCH RECEIVER

(75) Inventors: Franck Pra, Le Gua (FR); Raphaël Couturier, Sassenage (FR); Alain Ferriere, Llo (FR); Patrice Tochon, Uriage (FR)

(73) Assignees: Commissariat á l'énergie atomique et aux énergies alternatives, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 417 days.

(21) Appl. No.: 13/703,242

(22) PCT Filed: Jun. 10, 2011

(86) PCT No.: PCT/EP2011/059725
§ 371 (c)(1),
(2), (4) Date: Jan. 31, 2013

(87) PCT Pub. No.: WO2011/154537
PCT Pub. Date: Dec. 15, 2011

(65) Prior Publication Data
US 2013/0125873 A1 May 23, 2013

(30) Foreign Application Priority Data

Jun. 11, 2010 (FR) .................................... 10 54658

(51) Int. Cl.
*F24J 2/04* (2006.01)
*F22B 1/00* (2006.01)
(Continued)

(52) U.S. Cl.
CPC . *F24J 2/04* (2013.01); *F22B 1/006* (2013.01);
*F24J 2/07* (2013.01); *F24J 2/1047* (2013.01);
(Continued)

(58) Field of Classification Search
CPC ............ F22B 1/006; F24J 2/07; F24J 2/1047;
F24J 2/4636; F24J 2/04; F24J 2/4647; F24J
2002/0038; F24J 2002/108; Y02E 10/41
See application file for complete search history.

(56) References Cited

U.S. PATENT DOCUMENTS 4,300,539 A * 11/1981 Dobson .......................... 126/664
4,485,803 A * 12/1984 Wiener .......................... 126/591
(Continued)

FOREIGN PATENT DOCUMENTS

DE   197 44 541 A1   4/1999
JP   2005-195196 A   7/2005
(Continued)

OTHER PUBLICATIONS

U.S. Appl. No. 13/703,504, filed Feb. 28, 2013, Couturier et al.
(Continued)

*Primary Examiner* — Alfred Basichas
(74) *Attorney, Agent, or Firm* — Oblon, McClelland, Maier & Neustadt, L.L.P.

(57) ABSTRACT

A solar receiver for a thermal power plant including a plurality of absorber modules, each absorber module including at least one face configured to be illuminated by a solar flux, wherein the modules are arranged side by side forming a paving. Each absorber module further includes its own fluid circuit in which a fluid to be heated by the solar flux can flow, the fluid circuits of the absorber modules being connected to one another.

12 Claims, 6 Drawing Sheets

(51) Int. Cl.
*F24J 2/07* (2006.01)
*F24J 2/10* (2006.01)
*F24J 2/46* (2006.01)
*F24J 2/00* (2014.01)

(52) U.S. Cl.
CPC .............. *F24J 2/4636* (2013.01); *F24J 2/4647* (2013.01); *F24J 2002/0038* (2013.01); *F24J 2002/108* (2013.01); *Y02E 10/41* (2013.01)

(56) References Cited

U.S. PATENT DOCUMENTS

| | | |
|---|---|---|
| 6,003,508 A | 12/1999 | Hoffschmidt et al. |
| 2004/0035111 A1 | 2/2004 | Ven et al. |
| 2013/0125873 A1 | 5/2013 | Pra et al. |
| 2014/0000581 A1 | 1/2014 | Couturier et al. |
| 2014/0109893 A1 | 4/2014 | Couturier et al. |

FOREIGN PATENT DOCUMENTS

| | | |
|---|---|---|
| WO | WO 01/61254 A1 | 8/2001 |
| WO | WO 2004/023048 A1 | 3/2004 |

OTHER PUBLICATIONS

French Preliminary Search Report issued Feb. 14, 2011 in Patent Application No. 1054658 with English translation of categories of cited documents.
International Search Report issued Aug. 2, 2011 in PCT/EP2011/059725.
J.Karni, et al., "The "Porcupine": A Novel high-Flux Absorber for Volumetric Solar Receivers", J. Solar Energy Engineering, vol. 120, 1998, pp. 85-95.
Thomas Fend, et al., "Porous materials as open volumetric solar receivers: Experimental determination of thermophysical and heat transfer properties", Energy, 29 (5-6), 2004, pp. 823-834.
Didier Haillot, et al., "Storage composites for the optimization of solar water heating systems", Chemical Engineering Research and Design, 86 (6), 2008, pp. 612-617.
Peter Heller, et al., "Test and evaluation of a solar powered gas turbine system", Solar Energy, 80, 2006, pp. 1225-1230.
Akira Hoshi, et al., "Screening of high melting point phase change materials (PCM) in solar thermal concentrating technology based on CLFR", Solar Energy, 79, 2005, pp. 332-339.
J. Karni, et al., "The DIAPR: A High-Pressure, High-Temperature Solar Receiver", Solar Energy Engineering, 119, 1997, pp. 74-78.
A. Kribus, et al., "Inherent Limitations of Volumetric Solar Receivers", ASME Journal of solar Energy Engineering, 118, 1996, pp. 151-155.
S. Pincemin, et al., "Highly conductive composites made of phase change materials and graphite for thermal storage", Solar Energy Materials & Solar Cells, 92, 2008, pp. 603-613.
S. Pincemin, et al., "Elaboration of Conductive Thermal Storage Composites Made of Phase Change Materials and Graphite for Solar Plant", Journal of Solar Energy Engineering, 130 (1), 2008, pp. 1-5.
Wolf-Dieter Steinmann, et al., "Latent heat Storage Systems for Solarthermal Power Plants and Process Heat Applications", Proceedings of 14$^{th}$ International SolarPACES Symposium, 2008, pp. 1-8.
M. Vrinat, et al., "Experimental Qualification of a High Temperature Air Solar Absorber Based on Compact Heat Exchanger Technology", Proceedings of 15$^{th}$ International SolarPACES Symposium, Sep. 15-18, 2009, 7 pages.
B. D'Utruy, et al., "Une Chaudière solaire à air à haute température: Projet Sirocco", Revue Generale de Thermique, No. 269, May 1984, 12 pages. (With English Translation entitled "A High-Temperature Solar Boiler: Sirocco Project").

\* cited by examiner

MODULAR SOLAR RECEIVER AND SOLAR POWER PLANT COMPRISING AT LEAST ONE SUCH RECEIVER

FIELD OF THE INVENTION AND STATE OF THE RELATED ART

The present invention relates to a solar receiver and a concentrating solar power plant comprising at least one such receiver, more specifically a solar power tower.

Concentrating solar thermal technology consists of using solar radiation to heat a heat transfer fluid acting as a heat source in a thermodynamic cycle. Concentration makes it possible to reach temperatures of varying levels and thus benefit from varying degrees of thermodynamic conversion efficiency.

Typically, there are four categories of Concentrating Solar Power (CSP) systems: line-focus parabolic trough collectors, linear Fresnel concentrators, central receiver tower systems and mobile-focus parabolic receivers.

A solar power tower particularly comprises a solar receiver receiving solar radiation transmitted by mirrors referred to as heliostats. The solar receiver is the site where the solar radiation is converted into sensible heat. It acts as a heat exchanger wherein the heat is taken up exclusively in the form of radiation absorbed by a panel and diffused by conduction in the inner exchanger structure. The heat transfer fluid or heat exchange fluid flows in the inner structure and is heated by convective exchange.

A receiver particularly comprises an absorber wherein the fluid to be heated flows. Frequently, an absorber structure comprises a plurality of juxtaposed tubes wherein the transfer fluid flows, a portion of the surface of these tubes receiving the solar radiation. This technique is particularly suitable when the transfer fluid is a liquid, such as liquid water, oil or molten salts. On the other hand, in the case of gas, such as water vapour or air, the exchange coefficient at the panel drops, the illumination of one face of the tubes by the high solar flux gives rise to a significant difference in temperature between the illuminated face and the rear face, hence deformations potentially resulting in tube rupture.

Furthermore, the solar receiver is subject to very harsh conditions. Indeed, it is subject to a high operating temperature, thermal gradients through the inner structure thereof due to the conductive transfer of a high heat flux, and rapid wide-ranging temperature variations, particularly during cloudy spells.

Consequently, it is subject to expansions. However, these expansions may be become very restrictive in the case of receivers consisting of a single large plate.

Moreover, in the case of a large dimensional receiver, the receiver is not subject to homogeneous illumination over the entire surface thereof; indeed, there are high-flux areas subject to high heating, and low-flux zones subject to lower heating. Consequently, the fluid circulating in the receiver is not subject to homogeneous heating. Differential expansions thus arise, which are liable to be detrimental to the receiver structure. Moreover, the use of the receiver is not optimal.

Consequently, one aim of the present invention is that of offering a solar receiver which is relatively robust in respect of expansion. A further aim is that of offering a solar receiver wherein the heating of the fluid is optimised.

DESCRIPTION OF THE INVENTION

The aim mentioned above is achieved by a solar receiver consisting of a plurality of absorber modules each comprising a specific fluid circuit. The modules form a paving suitable for free expansion of each of the modules. Since the absorber modules have a smaller surface area with respect to an absorber according to the prior art, the surface of each module is subject to a more homogeneous flux. The module circuits are connected to each other.

Particularly advantageously, the fluid supply of the modules may be adapted according to the flux received. In the case of a module situated in a high-flux area, it may be supplied with cold fluid, and in the case of a module situated in a low-flux area, the module may be supplied with the fluid preheated in the module situated in the high-flux area. The temperature of the entire receiver is more homogeneous and the thermomechanical stress is reduced.

More generally, due to the modular design, any type of fluid circuit may be envisaged according to requirements and/or operating conditions.

Moreover, this modular design enables easier maintenance, since it is simply necessary to replace the defective module and not the entire receiver. Module replacement is quick and a full shutdown of the solar power plant may be reduced. In addition, it is possible to envisage having a few modules in stock for repairs, whereas it is inconceivable to have a full receiver in advance.

Advantageously, the fluid connections are made on the rear face of the modules, i.e. in a "cold" area of the module. Besides the fact that the thermomechanical stress is reduced, this connection makes it possible to optimise the effective surface area of the modules, preventing a loss of surface area by the presence of the connections in the areas exposed to the flux.

For example, the plurality of unitary absorber elements of the solar receiver according to the present invention is distributed into a plurality of groups, the absorber elements of one group are thus supplied by a fluid distributor and form a stage and the other groups each forming a stage are supplied in series. It is thus possible to adapt the surface area of each stage to the solar flux distribution provided by the mirror field. Advantageously, the solar receiver according to the invention may consist of a plurality of absorber modules connected in series, each stage consisting of modules connected in parallel.

The subject-matter of the present invention is thus a thermal power plant solar receiver comprising a plurality of absorber modules, each absorber module comprising at least one face to be illuminated by a solar flux, wherein the modules are arranged side by side forming a paving, a sufficient gap being provided between the adjacent absorber modules so as to prevent contact between absorber modules in the event of expansion, each absorber module further comprising a specific fluid circuit wherein a fluid to be heated by the solar flux is intended to flow, the fluid circuits of the absorber modules being connected to each other. Very preferentially, the fluid network of each absorber module comprises tubes substantially parallel to the face, each comprising a fluid supply inlet and discharge outlet, said inlets and outlets opening into a face of the absorber module opposite the face to be illuminated, and the fluid circuits of the absorber modules being connected to each other such that the fluid flows at least between a first absorber and a second absorber.

Advantageously, the absorber modules are oriented with respect to each other such that the solar flux gradient on each absorber module is limited. For example, the absorber modules are oriented so as to define concentric areas from a central area of the receiver.

The receiver according to the invention may comprise supply connectors and discharge connectors connected to the absorber module inlets and outlets, at least the supply connectors being expansion loops.

The tubes are advantageously embedded in a matrix having a high heat conductivity coefficient.

Preferably, the absorber modules are connected in series at least in groups of two, the groups being connected in parallel.

The absorber modules may be distributed at least into a first and a second group, the first group forming a central area of the receiver and the second group encompassing the first group and forming a peripheral area of the receiver, the absorber modules of each group being connected in parallel and the two groups being connected in series.

The subject-matter of the present invention is also a thermal power plant comprising at least one receiver according to the present invention, a fluid supply and means for collecting the heated fluid.

In one example of an embodiment, the first group is connected at the inlet to a cold fluid supply and the second group is connected at the outlet to a system using the fluid heated by the receiver.

In a further example of an embodiment, the second group is connected at the inlet to a cold fluid supply and the first group is connected at the outlet to a system using the fluid heated by the receiver. The modules of the second group may then have inferior temperature resistance properties with respect to those of the first group.

The thermal power plant according to the invention may comprise a tower whereon the receiver is mounted and at least one heliostat facing the receiver.

The fluid may be a gas, for example air, and the system using the heated gas is a gas turbine.

BRIEF DESCRIPTION OF THE FIGURES

The present invention will be understood more clearly using the following description and appended figures wherein.

DETAILED DESCRIPTION OF PARTICULAR EMBODIMENTS

Figure 1:
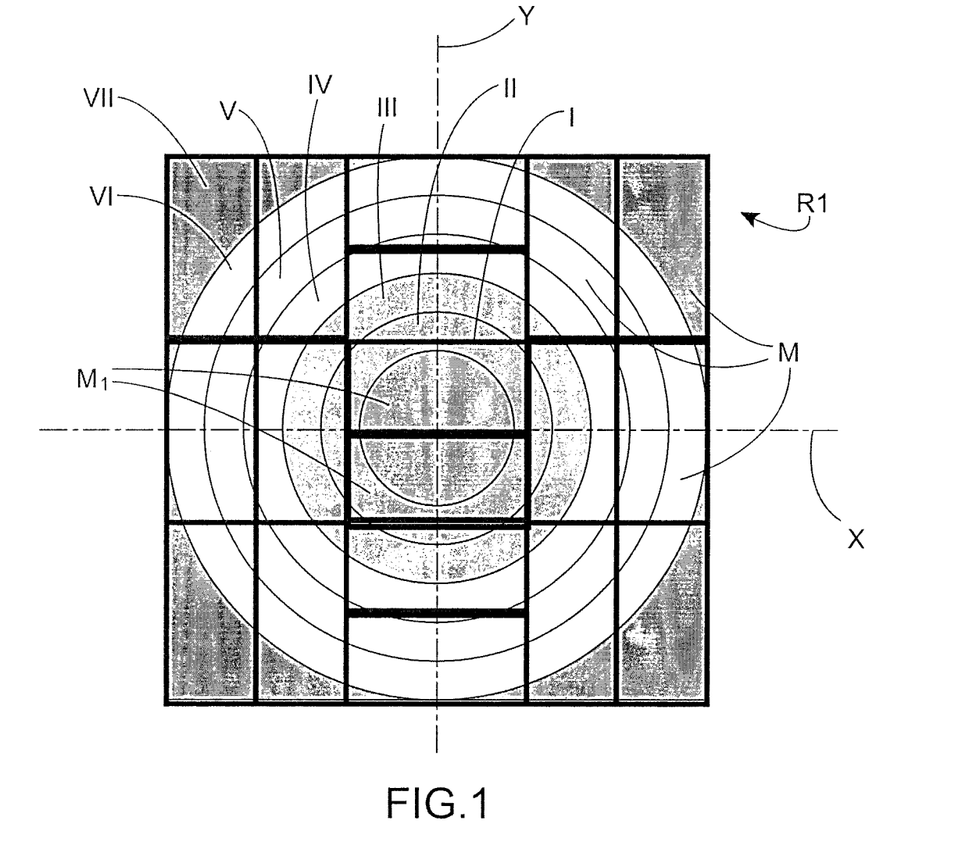
FIG. 1 is a schematic representation of the solar flux map on an embodiment of a modular receiver according to the present invention.

FIG. 1 shows an example of an embodiment of a modular receiver R1 according to the present invention comprising a plurality of modules M arranged side by side so as to form a substantially continuous paving. A gap j is provided between the edges of two adjacent modules so as to enable free expansion of each of the modules without any risk of contact and damage.

The gap j is dependent on the constituent materials of the modules, more specifically of the expansion coefficients thereof. The gap j is not necessarily identical between all the modules, this may for example be the case if not all the modules are made of the same material.

The gap may for example be between 1 and 15 mm, for example in the region of 7 mm.

For example, if the modules are made of stainless steel or a nickel-based alloy, a gap of about 7 mm equivalent to the expansion may be provided. The gap between the modules is suitable for calculation on the basis of the general knowledge of those skilled in the art.

In the example shown, the paving is square.

Figure 2:
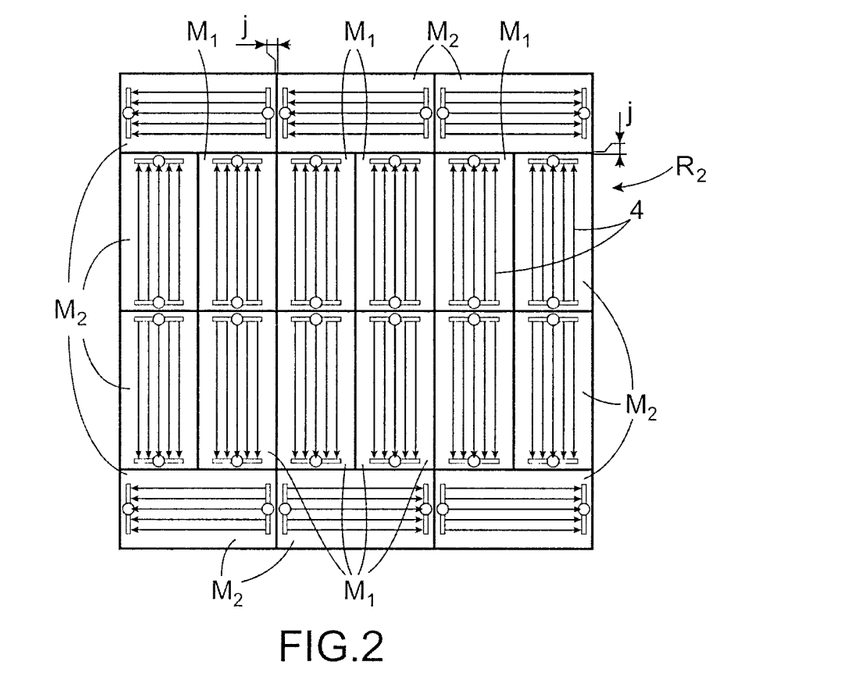
FIG. 2 is a schematic representation of a further example of an embodiment of a modular receiver according to the present invention.
Figure 3A:
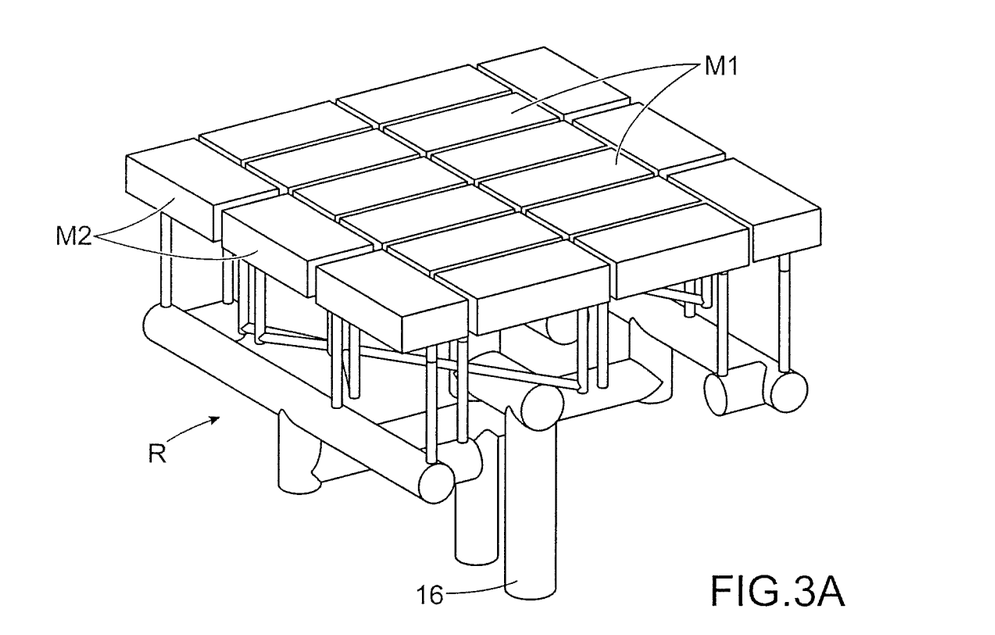
FIGS. 3A and 3B are schematic perspective views of the front face and the rear face, respectively, of an example of an embodiment of the modular receiver in FIG. 2.
Figure 3B:
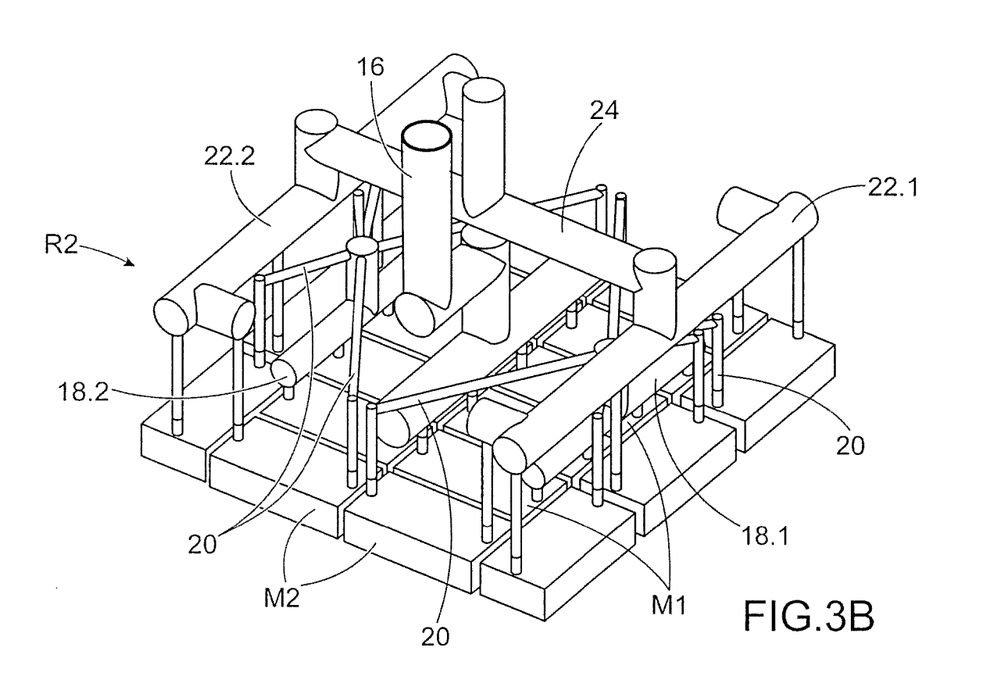

Moreover, according to the present invention, each module comprises its own fluid circuit shown in FIG. 3B and represented schematically by the arrows 4 in FIG. 2 of the other example of an embodiment, enabling considerable freedom in the embodiment of a fluid circuit.

In the example shown, the receiver R1 comprises 18 modules M.

The modules M, in the example shown, are rectangular, and have at least one plane face 6 to be illuminated by the solar flux.

In FIG. 1, the characteristic concentrated solar flux map of a power tower is overlaid schematically on the receiver R1. This map comprises substantially concentric areas, the darkest area receiving the maximum solar flux and the lightest area receiving the minimum solar flux.

The area receiving the maximum flux is situated in the centre of the map and is referenced I, and the area receiving the minimum flux is the outermost area and is referenced VII, the intermediate areas are referenced II to VI.

The solar power plant heliostats are oriented such that the area I covers a central area of the receiver.

In this case, the modules M are preferably oriented such that they encounter the lowest number of areas I to VII so as to be subject to a relatively invariant flux. For example, the central modules M1 are situated essentially in the area I and to a lesser extent in the area II. Preferably, the orientation of the modules is such that at least the majority of the modules are not illuminated by the six areas I to VII.

In this way, by means of the modular embodiment according to the invention, the modules receive fluxes of similar intensities, and not both the maximum flux and the minimum flux.

Alternatively, the two central modules M1 may be oriented such that the lengths thereof extend parallel to the axis Y and offer identical operation to the arrangement in FIG. 1.

Hereinafter in the description, a distinction will be made between two categories of areas, high-flux areas and low-flux areas.

Obviously, the greater the number of modules, and as such the smaller the surface area thereof, the lower the lack of homogeneity of the flux at the surface of each module. This increases the precision of the limits between the regions defined by the modules and it is thus possible to approximate the shape of the different flux areas.

It is also possible to envisage having modules of various shapes in the same receiver so as to enhance precision further.

However, for economical and practical design reasons, since each module has a specific fluid connection, it is generally chosen to limit the number of modules and thus have some lack of homogeneity of the flux on some or all of the modules. Moreover, it is generally more economical to arrange a standard module standard instead of a plurality of modules, even if the receiver operation is not optimal.

For example, the modules are positioned on a support frame provided with cross-beams so as to bear the load of each of the modules. The modules are preferentially not rigidly connected to the support to limit problems associated with a difference in heat expansion between the module material and that of the support frame. For example, the modules are positioned on the support, and the fluid supply and fluid discharge tubes provide system flexibility.

Preferably, the tubes are heat-insulated to reduce heat loss at the connections between the modules. The heat insulation is of a type known to those skilled in the art.

For example, each module comprises a layer of tubes parallel to the illuminated face and to each other.

In this case, it is possible to envisage specifically supplying each module according to the solar flux illuminating same.

The fluid circulating in the modules and between the modules is a pressurised fluid, for example at least above 5 Bar, this pressurised circulation being suitable for controlling the distribution of the fluid throughout the trajectory thereof contained in the interconnected tubes.

For example, it is possible to envisage supplying the modules situated in the high-flux areas with cold fluid and supplying the modules situated in the low-flux areas with the fluid outflowing from the high-flux areas.

In this way, for example, the modules situated in the high-flux areas are connected in parallel to a source of cold fluid, and are connected in series with the modules situated in the low-flux areas.

FIGS. 2, 3A and 3B show a further example of an embodiment of a modular receiver R2 according to the present invention.

FIG. 3A shows the receiver from the side of the face thereof intended to receive the solar flux, and FIG. 3B shows the receiver from the side of the fluid connections between the receiver modules on the rear face of the receiver.

As seen in FIG. 1 representing the flux map also applicable to the receiver R2, the high-flux area is situated at the centre and the low-flux area is situated at the outside. The receiver R2 has a simplified distribution with respect to that of the receiver in FIG. 1.

The receiver R2 comprises a total of 18 modules, eight modules M1 are situated at the centre in the high-flux area and ten modules M2 are situated at the outside surrounding the modules M1 in the low-flux area. It is thus possible to envisage the eight modules M1 being connected in parallel and connected in series with the ten modules M2. In the example shown, the supply of the modules M1 is provided at the centre of the receiver.

The distribution of the modules of the receiver R2 is suitable for reproducing the distribution of the solar flux on the receiver. This distribution makes it possible to enhance the operation of the receiver substantially with respect to that of receivers according to the prior art.

FIG. 3B shows an example of a fluid connection circuit between the modules of the receiver R2.

The fluid circuit comprises a conduit 16 for supplying the modules M1, which are supplied in parallel, two ducts 18.1, and 18.2 for collecting the heated fluid outflowing from the modules M1. Each collection duct 18.1, 18.2 collects the heated fluid from four modules M1, and redistributes same in four modules M2 in parallel via sub-ducts 20.

The outlet fluid from the modules M2 is collected via two ducts 22.1, 22.2, connected via a main duct 24 grouping together all the heated fluid outflowing from the receiver. This main duct 24 is connected for example to an area for storing the heated fluid with a view to the use thereof.

Figure 9:
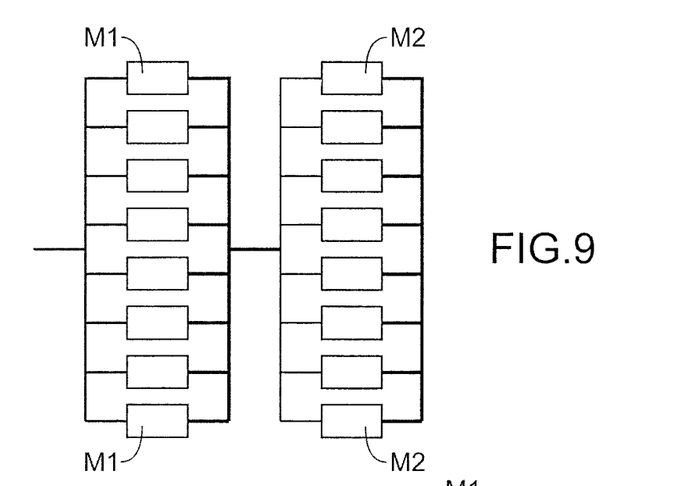
FIGS. 9, 10 and 11 are schematic representations of various connection modes between modules of a receiver according to the present invention.
Figure 10:
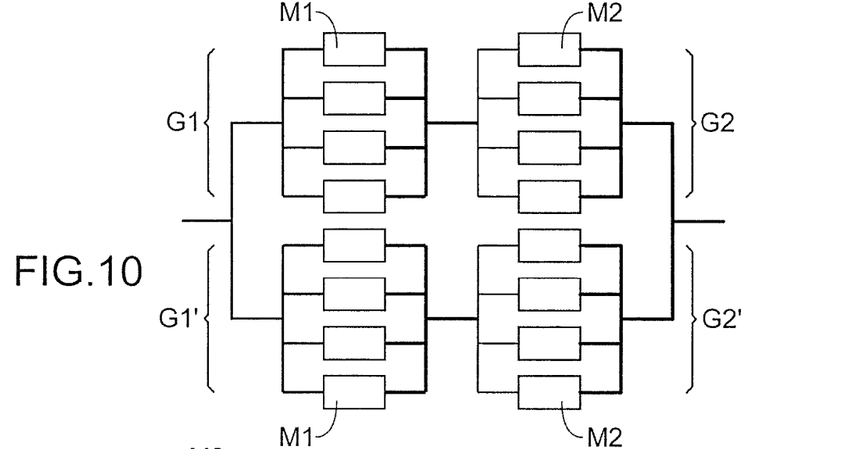
Figure 11:
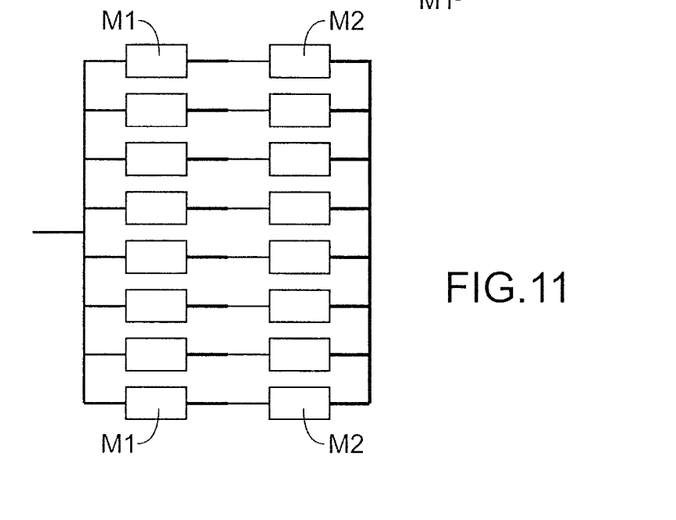

FIGS. 9, 10 and 11 show examples of connection between the modules M1 situated in a high-flux area and the modules M2 situated in the low-flux area.

In FIG. 9, the modules M1 are all supplied in parallel. At the outlet of the modules M1, the heated fluid in each module M1 is collected in parallel and is mixed so as to homogenise the temperature of the fluid before resupplying each of the modules M2 in parallel. The heated fluid in the modules M2 is also collected in parallel. This connection mode offers the advantage of homogenising the temperature of the fluid between each flux area.

FIG. 10 shows a further example of connection of the modules M1 and M2.

In this example, module sub-groups are created, in particular each flux area comprises eight modules, two sub-groups G1, G1' of four modules M1 are produced in the high-flux area, and two sub-groups G2, G2' of four modules M2 are produced in the low-flux area.

The two sub-groups G1, G1' are supplied in parallel, the modules in each sub-group are supplied in parallel.

Each sub-group G1, G1' is connected in series to a sub-group G2, G2', and the modules M2 of each of the sub-groups G2, G2' are supplied in parallel.

The fluid at the outlet of the sub-groups G2, G2' is collected in parallel and the fluids collected in each of the sub-groups are mixed.

FIG. 11 shows a further example of connection, wherein the modules M1 are supplied in parallel and each module M1 is connected in series with a module M2, the fluid at the outlet of the modules M2 is collected in parallel.

Obviously, the receiver may comprise more than two flux areas, and consequently, the connections described in FIGS. 9 to 11 are suitable for distribution of the modules into three or more solar flux areas.

Preferably, the connection fluid circuit architecture is such that it generates an identical or quasi-identical fluid flow rate between the modules. In this case, the circuit design accounts for head losses generated by the modules and by the diameter of the ducts selected.

As explained above, the modules are arranged side by side so as to form a substantially continuous paving. A gap j is provided between the edges of two adjacent modules so as to enable free expansion of each of the modules, thus reducing the risks of contact between the modules and the damage thereof.

Figure 4:
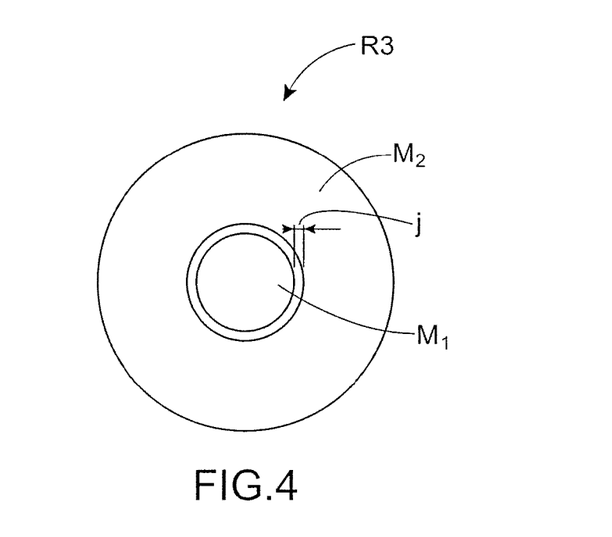
FIG. 4 is a schematic representation of a further example of an embodiment of a modular receiver according to the present invention.

FIG. 4 shows a further example of an embodiment wherein the receiver R3 has a circular shape and comprises two concentric modules, a first circular central module M1 subject to the high flux and an annular outer module subject to the low flux M2. A gap j is provided between the edge of the first module and the inner edge of the second module.

Obviously, a modular receiver having any other shape and comprising modules having any shape, for example rectangular, rhombic, elliptical or of any shape, does not leave the scope of the present invention.

Figure 5:
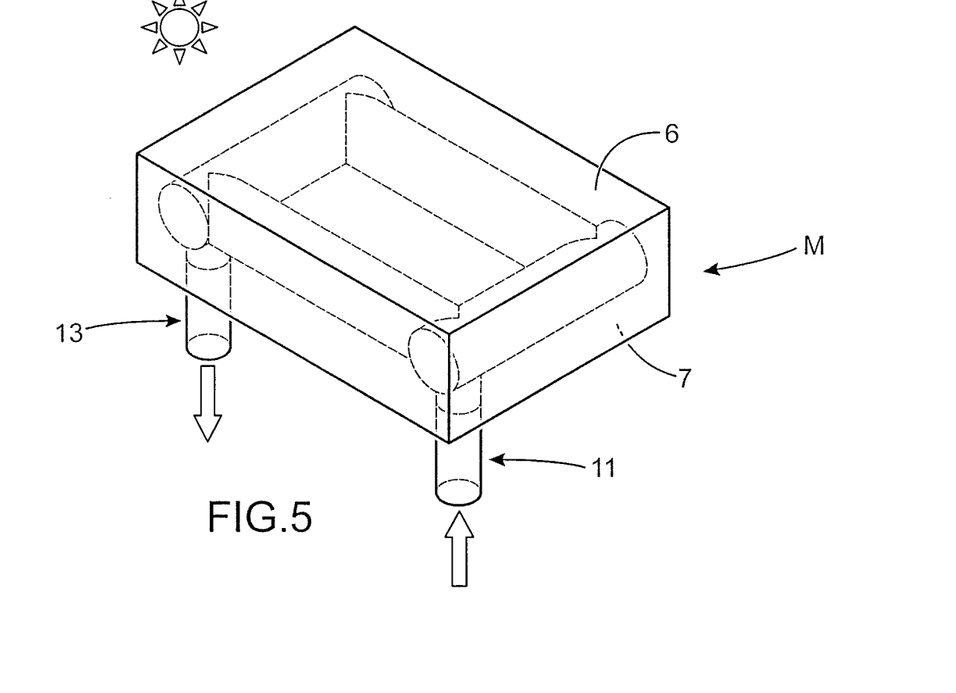
FIG. 5 is a schematic representation of an absorber module alone, particularly suitable for producing a modular receiver according to the invention.

FIG. 5 shows, schematically, an example of a module particularly suitable for producing a modular receiver according to the invention.

The module M comprises a face 6 to be illuminated by the solar flux represented by a sun, and an opposite face 7 or rear face which is not illuminated.

The module M comprises at least one tube 10, advantageously a plurality thereof, forming the fluid circuit extending substantially parallel to the face 6 and fluid supply 11 and discharge 13 collectors at the inlet and outlet of the tubes 10 respectively. The fluid circulation is represented by arrows.

Particularly advantageously, the tubes 10 open into the rear face 7 of the module and the collectors 11, 13 are also arranged on the rear face.

In this case, the collectors 11, 13 are not subject to the solar flux, the temperature stress is thus reduced, limiting the risks of damage thereof. In this case, the collectors may be made of materials having a lower temperature resistance and generally a lower cost price. Moreover, if the collectors were to be connected to the tubes by soldering, the risks of leakage are reduced.

Moreover, arranging the tube outlets and the collectors on the rear face makes it possible to increase the effective surface area of the receiver. Indeed, as seen in FIGS. 1 and 3, almost all the surface of the receiver facing the solar flux is used for transmitting the energy from the solar flux to the fluid. Indeed, the entire surface of the receiver consists of the faces 6 of the modules, apart from the spaces between the modules forming idle areas; however, the width thereof may be optimised so as to reduce the surface areas thereof.

Also advantageously, it is envisaged for the connection between the tubes 10 and the outer fluid circuit to be suitable for absorbing the differential expansions between the modules. Expansion bellows may be used for this purpose.

More advantageously, supply tubes are produced, directly having a shape suitable for doing away with the need for expansion joints, for example acting as expansion bends. The collection tubes may also act as expansion loops; however, the expansion problem is less severe since they are traversed by a heated fluid and are also subject to expansion.

Figure 6:
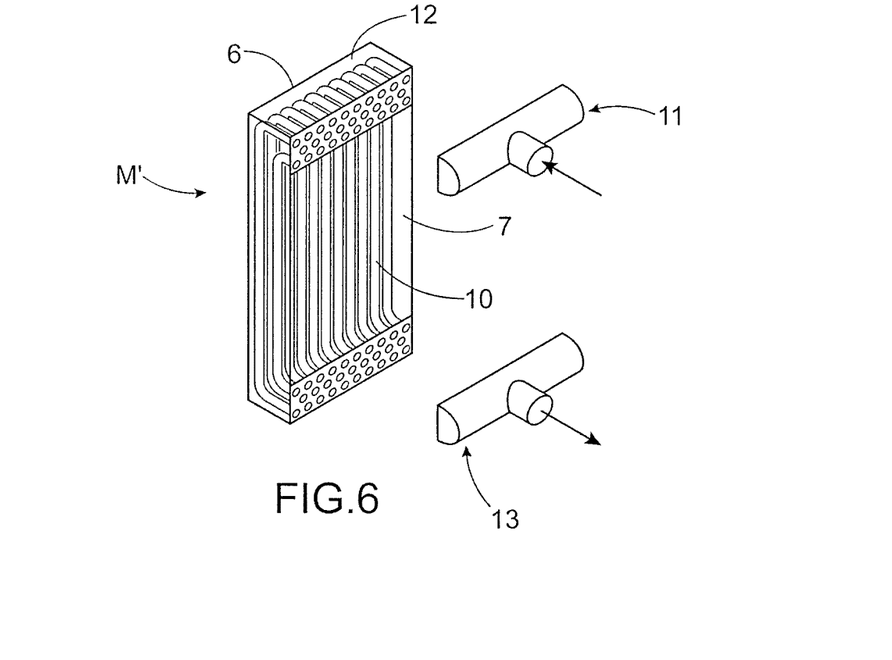
FIG. 6 is a perspective view of a practical embodiment of a module suitable for producing a modular receiver according to the invention.

FIG. 6 shows a further example of a module M' particularly suitable for producing a modular receiver according to the present invention. In this example, the module comprises a plurality of tubes 10 distributed into layers embedded in a matrix 12 having very good heat conduction greater than 100 W/m/K, the layers being stacked in a normal direction with respect to the illuminated face 6.

The matrix comprises at least one metal or metal-based alloy, preferably a metal or metal alloy based on copper and/or aluminium.

Alternatively, the core may be made of magnesium, silver, gold, zinc, tungsten.

The alloys may be brass, bronze, Al/Si and Al/Cu alloys, Monel (70Ni-30Cu), copper-based composites with alumina dispersoids (Glidcop).

As in the example of a module in FIG. 5, the tubes 10 open onto the rear face 7 of the module. This example offers the advantage of reducing the temperature gradient within the module and of reducing the effects of the passage of a cloud causing the solar flux to disappear. The matrix 12, which stores heat when the solar flux illuminates the module, releases this heat when the flux disappears, providing a progressive decline in the temperature of the fluid outflowing from the module and the components of the module per se. The thermomechanical stress within the module is reduced and the temperature variations of the temperature variations of the fluid and the downstream components are smoothed. The matrix is received in an enclosure having a high temperature resistance.

Due to the geometric modularity of the receiver, it is possible to adapt the module according to the solar flux wherein it is situated. The modules situated in the high-flux area are made of one or more high temperature-resistant materials, whereas those situated in the low flux area may be made of materials resistant to lower temperatures. The production cost associated with the module materials may then be generally reduced.

Due to the modularity of the receiver, it is possible to produce different fluid circuits and thus optimise the design of the modules according to requirements and the sought or required operating conditions.

Hereinafter in the description, a receiver consisting of modules as shown in FIG. 6 will now be discussed. The panel in question is that bearing the face 6 illuminated by the flux.

If the inlet fluid supplies the module situated in the low-flux area, the panel temperature is moderate. Typically with a fluid inlet temperature of 300° C., the panel temperature is in the region of 550° C. A stainless steel may be used to produce the module. On the other hand, the module situated in the high-flux area is supplied with a fluid already preheated by the module situated in the low-flux area and, due to the exposure to the high flux, the panel temperature reaches approximately 1000° C.

Different materials between modules may be chosen, based on the flux area wherein it is situated. Taking into consideration that the cost price of a less heat-resistant material is generally lower than a more temperature-resistant material, the production cost of the receiver may be optimised.

Figure 7:
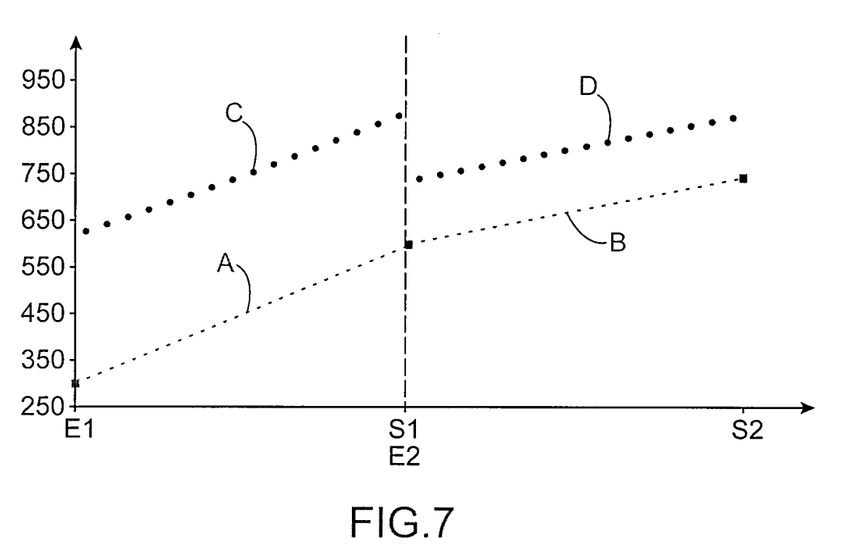
FIG. 7 is a graphic representation of the progression of the temperature in ° C. of the fluid and of the panel of the module to be illuminated if the modules situated in a high-flux area are supplied with the cold fluid, and the modules situated in a low-flux area are supplied with the fluid outflowing from the modules situated in the high-flux area.

FIG. 7 shows the progression of the temperature T in ° C. of the fluid or the module panel bearing the face 6 when the cold fluid supplies the modules situated in the high-flux area and the modules situated in the low-flux area are supplied by the fluid outflowing from the modules situated in the high-flux area.

E1 refers to the module inlet in the high-flux area; S1 refers to the module outlet in the high-flux area; E2 refers to the module inlet in the low-flux area; and S2 refers to the module outlet in the low-flux area.

The temperature of the module panel situated in the high-flux area is shown by curve C.

The temperature of the module panel situated in the low-flux area is shown by curve D.

The temperature of the fluid circulating in the module situated in the high-flux area is shown by curve A.

The temperature of the fluid circulating in the module situated in the low-flux area is shown by curve B.

It is noted in this example of fluid supply that the module panel temperatures are quasi-identical.

It is then possible to use modules having the same temperature resistance properties. In this specific case, the maximum module temperature is 900° C., nickel-based alloys may then be used.

Obviously, the receiver according to the present invention may have any type of fluid connection, for example but not in a limiting manner:

all the modules may be supplied in parallel by a cold fluid source, regardless of the flux received by each module, as described above, it is possible to envisage supplying the modules situated in the high-flux area with the cold fluid in parallel, the modules situated in the low-flux area being supplied by the fluid outflowing from the modules situated in the high-flux area; or as also described above, supplying the modules situated in the low-flux area with the cold fluid in parallel, the modules being supplied by the fluid outflowing from the modules situated in the low-flux area.

Alternatively, it may be advantageous to connect two or a plurality of modules in series and connect groups of modules connected in series in parallel. For example, if the receiver comprises 16 modules, pairs of modules are advantageously connected in series so as to no longer have merely 8 connections in parallel, making it possible to reduce the flow rate disparities between the modules and thus reduce the risk of the appearance of hot spots. Moreover, fluid distribution is enhanced since the head losses are increased with respect to 16 parallel connections. While connecting modules in series makes it possible to reduce the risks of poor fluid distribution with respect to an entirely parallel arrangement, it is advisable to re-mix the fluid outflowing from the modules M1 such that the fluids supplying the modules M2 have identical temperature levels, as represented schematically in FIG. 9.

With the present invention, it is possible to obtain a fluid outflowing from the modules with similar temperatures, which is not the case with receivers according to the prior art consisting of tubes arranged side by side, from one edge to an opposite edge of the receiver. Indeed, each tube does not receive the same flux, which varies along the length of each tube, the temperatures of the fluid outflowing from each tube varying considerably, which may be detrimental to the downstream elements from the receiver. Re-mixing at the outlet of the modules M1 is thus of particular interest to prevent damage on the downstream elements.

Moreover, the modular receiver according to the present invention offers the advantage of involving simplified maintenance. Indeed, if a module is defective, for example in the event of leak, it may be replaced individually, without requiring replacement of full receiver. Furthermore, this replacement reduces the shutdown time of the solar power plant considerably. Besides the reduced repair cost, the service time is reduced substantially, particularly as it is possible to have some modules in stock, unlike a full receiver.

The receiver according to the present invention also offers the advantage of being easily adapted to modify the output thereof. Particularly when producing receivers having higher outputs, it is simply necessary to increase the number of stages and the number of modules per stage.

Figure 8:
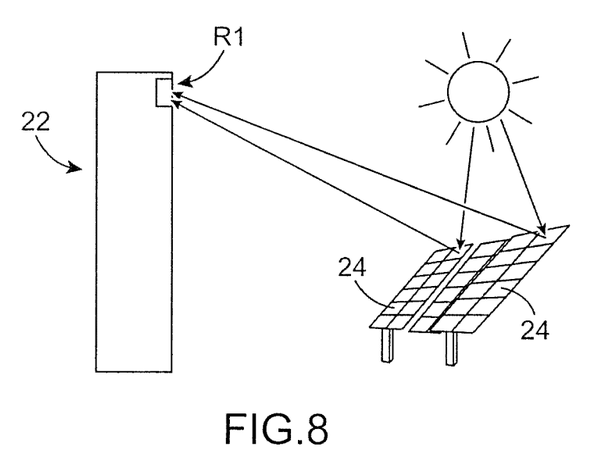
FIG. 8 is a schematic representation of a solar power plant according to the present invention.

FIG. 8 shows a schematic representation of a solar power tower according to the present invention comprising a receiver R1 according to the present invention mounted at the top of a tower 22 surrounded by heliostats 24 facing the receiver and returning a concentrated solar flux F to the modular receiver R1.

The receiver is for example connected to a gas turbine and supplies it with hot gas.

The invention claimed is:

1. A solar receiver for a thermal power plant comprising:
a plurality of absorber modules, the modules being arranged side by side forming a paving which receives solar radiation concentrated according to a predetermined solar flux map which provides relatively higher solar flux to a first absorber module at a first position in the paving and a relatively lower solar flux to a second absorber module at a second position in the paving, a sufficient gap being provided between adjacent absorber modules so as to prevent contact between absorber modules in event of expansion, each absorber module comprising:
at least one face configured to be illuminated by a solar flux;
its own fluid circuit in which a fluid to be heated by the solar flux is configured to flow, the fluid circuits of the absorber modules being connected to one another;
wherein the fluid circuit of each absorber module comprises tubes substantially parallel to the face, each comprising a fluid supply inlet and discharge outlet, the inlets and outlets opening into a face of the absorber module opposite the face to be illuminated, and
wherein the fluid circuits of the absorber modules are connected to a fluid supply and to each other such that the fluid flows to the first absorber and the second absorber based on relative temperature of the fluid and a position of the first and second absorber modules in the paving.

2. A solar receiver according to claim 1, wherein the absorber modules are oriented with respect to each other such that a solar flux gradient on each absorber module is limited, the absorber modules being oriented so as to define concentric areas from a central area of the receiver.

3. A solar receiver according to claim 1, wherein the tubes are embedded in a matrix having a high heat conductivity coefficient.

4. A solar receiver according to claim 1, further comprising supply connectors and discharge connectors connected to the absorber module inlets and outlets, at least the supply connectors being expansion loops.

5. A solar receiver according to claim 1, wherein the absorber modules are connected in series at least in groups of two, the groups being connected in parallel.

6. A solar receiver according to claim 1, wherein the absorber modules are distributed at least into a first group and a second group, the first group forming a central area of the receiver and the second group encompassing the first group and forming a peripheral area of the receiver, the absorber modules of each group being connected in parallel and the two groups being connected in series.

7. A thermal power plant according to claim 2, wherein the absorber modules are distributed at least into a first group and a second group, the first group forming a central area of the receiver and the second group encompassing the first group and forming a peripheral area of the receiver, the absorber modules of each group being connected in parallel and the two groups being connected in series, and wherein the first group is connected at an inlet to a cold fluid supply and the second group is connected at an outlet to a system using fluid heated by the receiver.

8. A thermal power plant comprising:
at least one receiver according to claim 1; and
a fluid supply and means for collecting a heated fluid.

9. A thermal power plant according to claim 8, wherein the absorber modules are distributed at least into a first group and a second group, the first group forming a central area of the receiver and the second group encompassing the first group and forming a peripheral area of the receiver, the absorber modules of each group being connected in parallel and the two groups being connected in series, and wherein the second group is connected at an inlet to a cold fluid supply and the first group is connected at an outlet to a system using fluid heated by the receiver.

10. A thermal power plant according to claim 9, wherein the modules of the second group have inferior temperature resistance properties with respect to the modules of the first group.

11. A thermal power plant according to claim 8, further comprising a tower on which the receiver is mounted and at least one heliostat facing the receiver.

12. A thermal power plant according to claim 8, wherein the fluid is a gas, or is air, and the system using the heated gas is a gas turbine.

* * * * *